United States Patent
Kiwaki et al.

(10) Patent No.: US 9,452,643 B2
(45) Date of Patent: Sep. 27, 2016

(54) PNEUMATIC TIRE WITH MAIN GROOVE HAVING SERPENTINE GROOVE WALLS

(75) Inventors: Yukihiro Kiwaki, Higashimurayama (JP); Shungo Fujita, Kunitachi (JP); Takaaki Kojima, Higashimurayama (JP); Kenjiro Yamaya, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1194 days.

(21) Appl. No.: 13/148,418

(22) PCT Filed: Feb. 9, 2010

(86) PCT No.: PCT/JP2010/051875
§ 371 (c)(1),
(2), (4) Date: Sep. 26, 2011

(87) PCT Pub. No.: WO2010/090327
PCT Pub. Date: Aug. 12, 2010

(65) Prior Publication Data
US 2012/0018068 A1 Jan. 26, 2012

(30) Foreign Application Priority Data

Feb. 9, 2009 (JP) ................................. 2009-027705
Jun. 10, 2009 (JP) ................................. 2009-139242

(51) Int. Cl.
*B60C 11/03* (2006.01)
*B60C 11/04* (2006.01)
*B60C 11/13* (2006.01)

(52) U.S. Cl.
CPC ........ *B60C 11/1353* (2013.04); *B60C 11/0302* (2013.04); *B60C 11/0304* (2013.04);
(Continued)

(58) Field of Classification Search
CPC . B60C 11/1353; B60C 11/04; B60C 11/042; B60C 2011/0344; B60C 2011/1361; B60C 11/0302; B60C 11/0306; B60C 11/0304
USPC .............. 152/209.8, 209.18, 209.19, 209.21, 152/209.26, 209.28
See application file for complete search history.

(56) References Cited

U.S. PATENT DOCUMENTS 4,462,446 A 7/1984 Goergen et al.
5,373,882 A * 12/1994 Nakagawa ............... 152/209.28
(Continued)

FOREIGN PATENT DOCUMENTS

EP 0 598 568 A1 5/1994
GB 655710 A * 8/1951
(Continued)

OTHER PUBLICATIONS

Machine translation for Japan 2006-182126 (no date).*
(Continued)

*Primary Examiner* — Steven D Maki
(74) *Attorney, Agent, or Firm* — Sughrue Mion, PLLC

(57) ABSTRACT

A pneumatic tire which comprises a land portion (10) and a land portion (20). A main groove (50) extending along the tire circumferential direction is formed between the land portion (10) and the land portion (20). The land portion (10) comprises a groove wall (10a) that forms the main groove (50). The land portion (20) comprises a groove wall (20a) that forms the main groove (50). The groove wall (10a) and the groove wall (20a) are serpentine along the tire circumferential direction (R) when seen from a plane of the tread surface, and the groove width of the main groove (50) in the tread width direction ($W_{TR}$) varies in a predetermined repetition interval ($\lambda$) along the tire circumferential direction. The ratio of the minimum width ($W_{MIN}$) of the groove to the maximum width ($W_{MAX}$) of the groove satisfies a relation of $35\% \leq W_{MIN}/W_{MAX} \leq 85\%$.

7 Claims, 10 Drawing Sheets

(52) U.S. Cl.
CPC ............ *B60C11/0306* (2013.04); *B60C 11/04* (2013.01); *B60C 11/042* (2013.04); *B60C 2011/0344* (2013.04); *B60C 2011/0346* (2013.04); *B60C 2011/1361* (2013.04)

(56) References Cited

U.S. PATENT DOCUMENTS

| | | | |
|---|---|---|---|
| 5,472,030 A | | 12/1995 | Shibata et al. |
| 6,601,624 B2 | * | 8/2003 | Ratliff, Jr. ................ 152/209.19 |
| 6,796,350 B1 | | 9/2004 | Gerresheim et al. |
| 2003/0192634 A1 | | 10/2003 | Hino |

FOREIGN PATENT DOCUMENTS

| | | | | |
|---|---|---|---|---|
| JP | 58-191610 A | | 11/1983 | |
| JP | 06-004365 B2 | * | 1/1994 | |
| JP | 6-143937 A | | 5/1994 | |
| JP | 06-239108 A | * | 8/1994 | |
| JP | 7-025209 A | | 1/1995 | |
| JP | 07-276920 A | * | 10/1995 | |
| JP | 7-329512 A | | 12/1995 | |
| JP | 8-011508 A | | 1/1996 | |
| JP | 10-151914 A | * | 6/1998 | |
| JP | 10-166815 A | * | 6/1998 | |
| JP | 2001-039122 A | | 2/2001 | |
| JP | 2002-225511 A | | 8/2002 | |
| JP | 2003-063211 A | | 3/2003 | |
| JP | 2006-076349 A | * | 3/2006 | |
| JP | 2006-182126 A | | 7/2006 | |
| JP | 2006-182126 A | * | 7/2006 | |
| JP | 2006-205824 A | | 8/2006 | |

OTHER PUBLICATIONS

Machine translation for Japan 06-004365 B2 (no date).*
Machine translation for Japan 2006-076349 (no date).*
Machine translation for Japan 10-166815 (no date).*
Machine translation for Japan 10-151914 (no date).*
Machine translation for Japan 07-276920 (no date).*
Machine translation for Japan 06-239108 (no date).*
International Search Report of PCT/JP2010/051875 dated May 11, 2010.
Extended European Search Report, dated Apr. 18, 2013, issued in corresponding European Patent Application No. 10738655.9.
Japanese Office Action, dated Mar. 5, 2013, issued in corresponding Japanese Patent Application No. 2009-027705.

* cited by examiner

PNEUMATIC TIRE WITH MAIN GROOVE HAVING SERPENTINE GROOVE WALLS

CROSS REFERENCE TO RELATED APPLICATIONS

This application is a National Stage of International Application No. PCT/JP2010/051875 filed Feb. 9, 2010, claiming priority based on Japanese Patent Application No. 2009-027705 filed on Feb. 9, 2009 and Japanese Patent Application No. 2009-139242 filed Jun. 10, 2009, the contents of all of which are incorporated herein by reference in their entirety.

TECHNICAL FIELD

The present invention relates to a pneumatic tire in which a main groove extending in a circumferential direction of the tire is formed and, more particularly, to a pneumatic tire of which reduction in water expelling capability is controlled.

BACKGROUND ART

In the related art pneumatic tires, various methods of improving expelling capability of water which is trapped between the road surface and a tread have been used to reduce hydroplaning. For example, a method in which a streamline-shaped recess, when seen from the plane of a tread surface, is formed on a groove wall of a main groove provided along the circumferential direction of the tire is known (for example, Patent Document 1). According to such a pneumatic tire, a turbulent flow of water which flows in the main groove can be controlled and water expelling capability is improved.

PRIOR ART LITERATURE

Patent Document

Patent Document 1: Japanese Patent Application Laid-open No. 2006-205824 (Page 5, FIG. 1)

SUMMARY OF THE INVENTION

The related art pneumatic tires described above have the following problems. That is, there is a problem that, if the number of transverse grooves which intersect the main groove is reduced in order to increase rigidity of land portions which are, in particular, blocks defined by a main groove, water expelling capability decreases and hydroplaning tends to occur.

Accordingly, an object of the present invention is to provide a pneumatic tire which can control reduction of water expelling capability even if the number of transverse grooves which intersect a main groove is reduced.

To solve the above problems, the present invention has following features. Firstly, a first feature of the present invention is summarized as a pneumatic tire which includes: a first land portion (i.e. land portion 10) which extends along a circumferential direction (circumferential direction R) of the tire and comes in contact with a road surface; and a second land portion (i.e. land portion 20) which extends along the circumferential direction of the tire and comes in contact with the road surface, in which a main groove (i.e. main groove 50) extending along the circumferential direction of the tire is formed between the first land portion and the second land portion, wherein: the first land portion includes a first groove wall (i.e. groove wall 10a) which forms the main groove; the second land portion includes a second groove wall (i.e. groove wall 20a) which forms the main groove; the first groove wall and the second groove wall are serpentine along the circumferential direction of the tire when seen from a plane of the tread surface; a groove width of the main groove along a width direction of the tread (tread width direction $W_{TR}$) varies in a predetermined repetition cycle (cycle $\lambda$) along the circumferential direction of the tire; and a ratio of a minimum-width portion $W_{MIN}$ of the groove width and a maximum-width portion $W_{MAX}$ of the groove width satisfies a relation of $35\% \leq W_{MIN}/W_{MAX} \leq 85\%$.

According to such a pneumatic tire, a flow of water along a first groove wall and a second groove wall are produced in the main groove. Water which flows along the first groove wall and the second groove wall first passes through a maximum-width portion $W_{MAX}$ and then, as the groove width of the main groove decreases, is expelled in the direction of an extension line of a streamline along the first groove wall and the second groove wall at a minimum-width portion $W_{MIN}$.

According to such a pneumatic tire, since the groove width of the main groove in the width direction of the tread changes in a predetermined repeated cycle, the flow of water which flows in the main groove changes in width in the width direction of the tread in the predetermined repeated cycle.

That is, water in the main groove pulses in the predetermined repeated cycle and is expelled at the minimum-width portion $W_{MIN}$ in the direction of an extension line of the flow along the first groove wall and the second groove wall.

Therefore, according to such a pneumatic tire, since water which flows in the main groove can be periodically expelled outside the main groove even if the number of the transverse grooves which intersect the main groove is reduced, reduction in water expelling capability can be controlled.

If the ratio $W_{MIN}/W_{MAX}$ is less than 35%, since the flow along the first groove wall and the second groove wall and the flow along the circumferential direction concentrate excessively at the minimum-width portion $W_{MIN}$, reduction in water expelling capability cannot be controlled sufficiently.

If the ratio $W_{MIN}/W_{MAX}$ exceeds 85%, water in the main groove does not pulse and thus reduction of water expelling capability cannot be controlled sufficiently.

A second feature of the present invention according to the first feature is summarized that a relation of $(W_{MAX}-W_{MIN})/A \leq 0.25$ is satisfied where an average length along the width direction of the tread of the main groove is set to A.

According to this, compared with the case of $(W_{MAX}-W_{MIN})/A > 0.25$, reduction in rigidity of the land portions can be controlled reliably and reduction in braking performance can be controlled.

A technique to control occurrence of hydroplaning in a pneumatic tire which has a tread pattern which is asymmetrical about a equator line of the tire has been known (for example, Japanese Patent Application Laid-open No. 2004-90763). In this pneumatic tire, a position of a groove of which width along the width direction of the tread is the largest (hereinafter, "wide groove") among a plurality of grooves which form a plurality of land portions is situated out of alignment with the equator line of the tire (i.e., is offset).

Thus, in the vehicles in which a negative camber angle is set, a wide groove is situated inside the equator line of the tire when seen from the direction in which the tire is mounted on a vehicle. Thus, compared with the case in which the wide groove is situated on the equator line of the tire, water expelling performance to expel water trapped between the road surface and the tread is improved even if the number of grooves is reduced. However, since a possibility of improvement of water expelling performance is low by merely defining the position of the wide groove, a further improvement is required.

A third feature of the present invention according to the first feature or the second feature is summarized that a lug groove extending in the width direction of the tread is formed in at least one of the first land portion and the second land portion.

A fourth feature of the present invention according to any one of the first feature to the third feature is summarized that a wide-width groove portion which includes the maximum-width portion $W_{MAX}$ of the groove width is provided in the main groove; and the lug groove is inclined with respect to the circumferential direction of the tire and communicates with or is situated close to the wide-width groove portion.

A fifth feature of the present invention according to any one of the first feature to the fourth feature is summarized that distance from the equator line of the tire to the main groove is 9 to 25% with respect to a contact width of the tread with respect to the width direction of the tread.

A sixth feature of the present invention according to any one of the first feature to the fifth feature is summarized that the first groove wall and the second groove wall have a predetermined amplitude (amplitude a) along the width direction of the tread and the predetermined repetition cycle is 15 times to 100 times the predetermined amplitude.

A seventh feature of the present invention according to any one of the first feature to the sixth feature is summarized that the main groove forms a wide-width groove portion (wide-width groove portion 51A) which includes the maximum-width portion $W_{MAX}$; a raised portion (raised portion 70) which is raised outward in a radial direction of the tire is formed in a bottom portion (bottom portion 50btm) of the main groove; and the raised portion is formed in the wide-width groove portion.

A eighth feature of the present invention according to the seventh feature is summarized that a first side portion (side portion 70a) of the raised portion which faces the first groove wall extends along the first groove wall and a second side portion (side portion 70b) of the raised portion which faces the second groove wall extends along the second groove wall.

A ninth feature of the present invention according to the eighth feature is summarized that the raised portion is tapered toward a front end portion (front end 70f) and a rear end portion (rear end 70r) when seen from a plane of the tread surface.

A tenth feature of the present invention according to any one of the seventh feature to the ninth feature is summarized that the height (raised height $H_{70}$) of the raised portion is smaller than the depth (depth $H_{10}$) of the main groove.

Accordingly to the features of the present invention, a pneumatic tire which can control reduction of water expelling capability even if the number of transverse grooves which intersect a main groove is reduced can be provided.

BEST MODE FOR CARRYING OUT THE INVENTION

Figure 1:
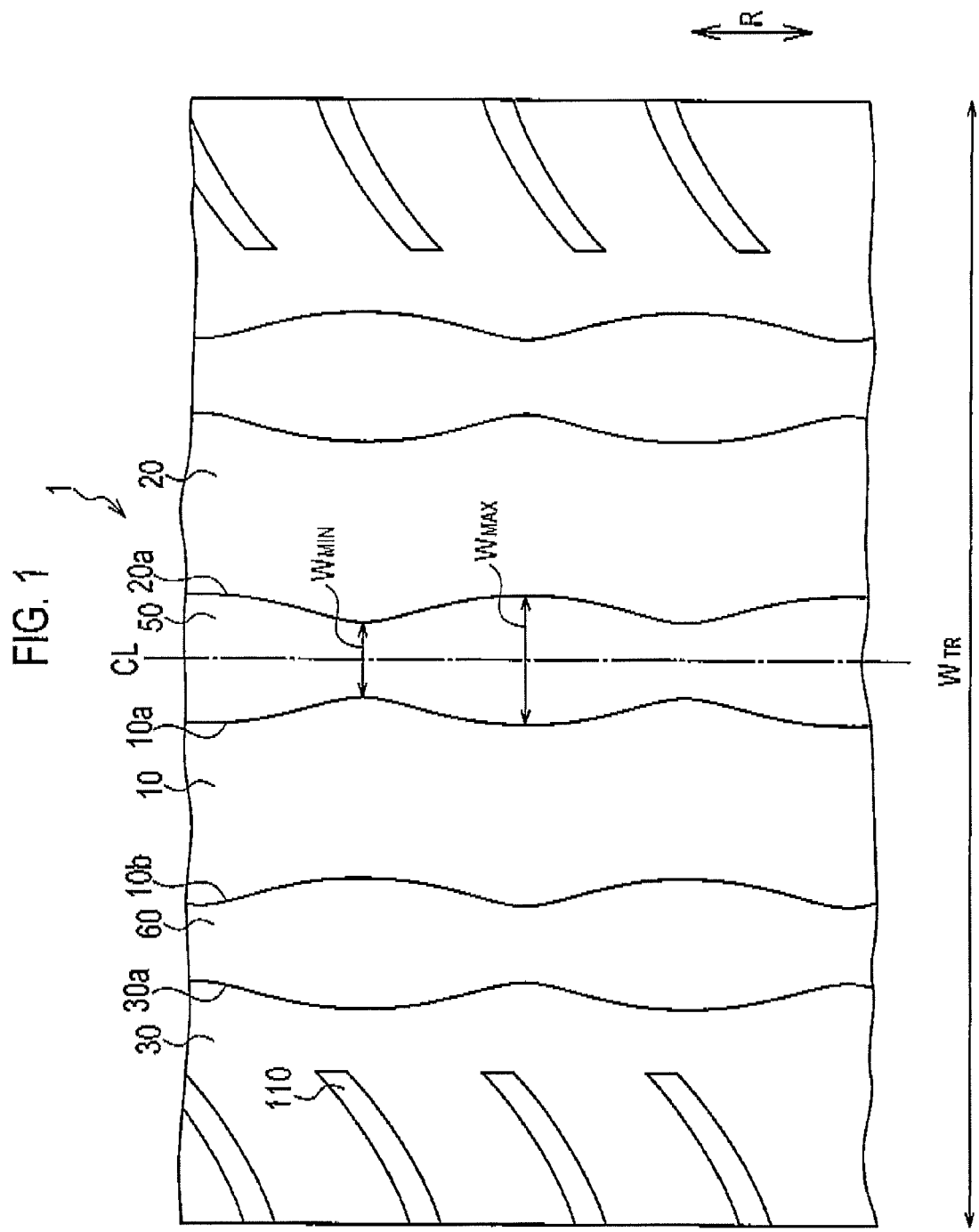
FIG. 1 is a developed view of a tread which constitutes a pneumatic tire according to a first embodiment of the present invention.

Subsequently, a first embodiment, a second embodiment, a third embodiment, a fourth embodiment, a comparative evaluation and other embodiments according to the present invention will be described with reference to the drawings. In the following description of the drawings, the same or similar reference numerals are given to the same or similar portions. It should be noted that the drawings are schematic only and the ratio of each dimension, for example, are different from reality.

Accordingly, specific dimensions should be determined in consideration of the following description. Of course, portions with relations and ratios of dimensions different from each other are included in the different drawings.

[First Embodiment]

In a first embodiment, (1.1) Structure of Pneumatic Tire, (1.2) Detailed Structure of Main groove and (1.3) Operation and Effect will be described.

(1.1) Structure of Pneumatic Tire

FIG. 1 is a developed view of a tread which constitutes a pneumatic tire 1 in the present embodiment. Each portion formed on a tread surface in the pneumatic tire 1 will be described. In particular, (1.1.1) Land Portion (1.1.2) Main groove will be described.

(1.1.1) Land Portion

The pneumatic tire 1 includes a land portion 10, a land portion 20 and a land portion 30 which extend along the circumferential direction R of the tire and come in contact with the road surface.

The land portion 10 includes a groove wall 10a (which will be described later) which forms a main groove 50 at an end thereof in the width direction $W_{TR}$ of the tread. The land portion 20 includes a groove wall 20a (which will be described later) which forms a main groove 50 at an end thereof in the width direction $W_{TR}$ of the tread. The land portion 30 includes transverse grooves 110 which open outside in the width direction $W_{TR}$ of the tread.

No transverse groove which intersects the main groove 50 is formed in the land portion 10 and the land portion 20. No transverse groove which intersects the main groove 60 is formed in the land portion 10 and the land portion 30.

(1.1.2) Main Groove

The pneumatic tire 1 includes a main groove 50 extending along the circumferential direction R of the tire between the land portion 10 and the land portion 20. The pneumatic tire 1 includes a main groove 60 extending along the circumferential direction R of the tire between the land portion 10 and the land portion 30.

The main groove 50 is provided on an equator line CL of the tire. The main groove 60 is provided outside the equator line CL of the tire in the width direction $W_{TR}$ of the tread.

In the first embodiment, the structure of one side bordering the equator line CL of the tire in the width direction $W_{TR}$ of the tread has been described. Since the structure of the other side bordering the equator line CL in the width direction $W_{TR}$ of the tread is the same as that described above, detailed description thereof will be omitted.

(1.2) Detailed Structure of Main Groove

Figure 2:
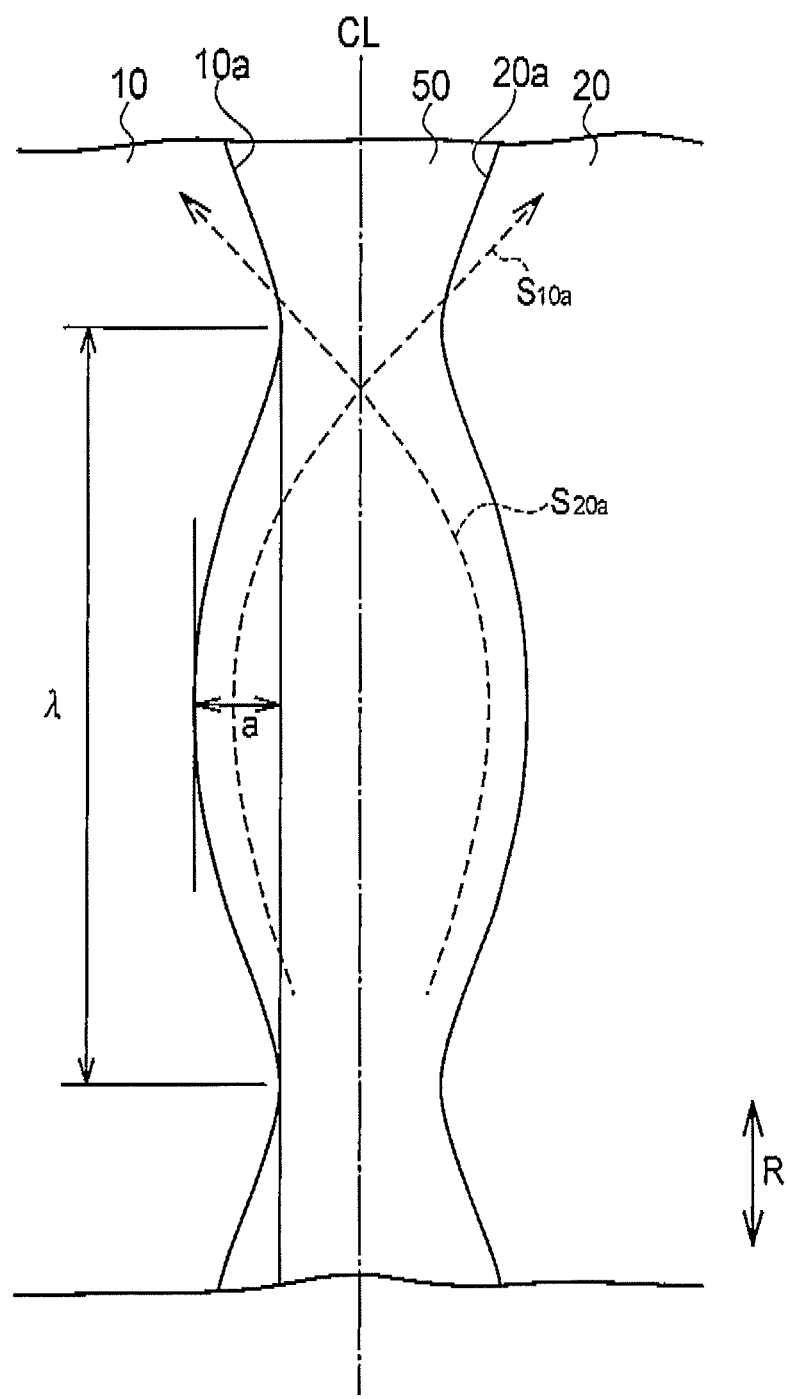
FIG. 2 is a partially enlarged view of a developed view of the tread which constitutes the pneumatic tire according to the first embodiment of the present invention.

A detailed structure of the main groove 50 will be described. In particular, detailed structures of (1.2.1) Groove Wall, (1.2.2) Groove Width, (1.2.3) Amplitude and Cycle of Main groove will be described with reference to FIG. 1 and FIG. 2. FIG. 2 illustrates a developed view in which the main groove 50 is enlarged in the tread which constitutes the pneumatic tire 1.

Since the structure of the main groove 60 is the same as that of the main groove 50, detailed description thereof is omitted.

(1.2.1) Groove Wall

The main groove 50 is formed by the groove wall 10a of the land portion 10 and the groove wall 20a of the land portion 20. The groove wall 10a and the groove wall 20a are serpentine in the circumferential direction R of the tire when seen from the plane of the tread surface. The groove wall 10a and the groove wall 20a are provided symmetrically about the center line of the main groove 50.

(1.2.2) Groove Width

The main groove 50 includes a groove width which changes in the predetermined cycle along the width direction $W_{TR}$ of the tread. In particular, the groove width of the main groove 50 represents the distance in the width direction $W_{TR}$ of the tread from an arbitrary point on the groove wall 10a to the groove wall 20a.

A ratio of a minimum-width portion $W_{MIN}$ of the groove width of the main groove 50 and a maximum-width portion $W_{MAX}$ of the groove width of the main groove 50 satisfies a relation of $35\% \leq W_{MIN}/W_{MAX} \leq 85\%$. A relation of $(W_{MAX}-W_{MIN})/A \leq 0.25$ is satisfied when an average length of the main groove 50 in the width direction $W_{TR}$ of the tread is set to A.

(1.2.3) Amplitude and Cycle of Main Groove

As illustrated in FIG. 2, the groove width of the main groove 50 changes in a cycle λ along the circumferential direction R of the tire. The groove wall 10a and the groove wall 20a have an amplitude a along the width direction $W_{TR}$ of the tread.

The groove wall 10a and the groove wall 20a change in the cycle λ along the circumferential direction R of the tire when seen from the plane of the tread surface. The groove wall 10a and the groove wall 20a are provided in symmetrical shapes in the front and rear directions about the maximum-width portion $W_{MAX}$ when the minimum-width portion $W_{MIN}$ is set to the starting point of the cycle λ.

A relation between the cycle λ which is the cycle in the groove width of the main groove 50 in the circumferential direction R of the tire and is the cycle of the groove wall 10a and the groove wall 20a in the circumferential direction R of the tire and the amplitude a is the following: the cycle λ is 15 times to 100 times the amplitude a.

The cycle λ of the main groove 50 and the cycle λ of the main groove 60 are out of alignment by a half cycle.

At the time of rotation of the tire, a relation between the tread length which is the length, in the circumferential direction R of the tire, of the tread which comes in contact with the road surface and the cycle λ of the main groove 50 is the following: the tread length is 0.5 to 20 times the cycle λ.

(1.3) Operation and Effect

As described above, according to the pneumatic tire 1 according to the present embodiment, a streamline $S_{10a}$ and a streamline $S_{20a}$ which are flows of water along the groove wall 10a and the groove wall 20a are produced in the main groove 50. Water which flows along the groove wall 10a and the groove wall 20a first passes through the maximum-width portion $W_{MAX}$ and then, as the groove width of the main groove 50 decreases, is expelled in the direction of extension lines of the streamline $S_{10a}$ and the streamline $S_{20a}$ at the minimum-width portion $W_{MIN}$.

According to such a pneumatic tire 1, since the groove width of the main groove 50 in the width direction $W_{TR}$ of the tread changes in the cycle λ, water which flows in the main groove 50 flows with the width in the width direction $W_{TR}$ of the tread changing in the cycle λ.

That is, water in the main groove 50 pulses in the cycle λ and is expelled at the minimum-width portion $W_{MIN}$ in the direction of the extension lines of the streamline $S_{10a}$ and the streamline $S_{20a}$.

Therefore, according to such a pneumatic tire 1, since water which flows in the main groove 50 can be expelled outside the main groove 50 even if the number of the transverse grooves which intersect the main groove is reduced, reduction in water expelling capability can be controlled.

If the ratio $W_{MIN}/W_{MAX}$ is less than 35%, since the flow along the groove wall 10a and the groove wall 20a and the flow along the circumferential direction R of the tire concentrate excessively at the minimum-width portion $W_{MIN}$, reduction in water expelling capability cannot be controlled sufficiently.

If the ratio $W_{MIN}/W_{MAX}$ exceeds 85%, water in the main groove 50 does not pulse and thus reduction of water expelling capability cannot be controlled sufficiently.

In the present embodiment, the groove wall 10a and the groove wall 20a have the amplitude a along the width direction $W_{TR}$ of the tread and the cycle λ is 15 times to 100 times the amplitude a; thus water which flows in the main groove 50 can be expelled outside the main groove 50 effectively and thus reduction in water expelling capability can be further controlled.

Since the cycle λ is more than twice the amplitude a, excessive concentration of the flow along the groove wall 10a and the groove wall 20a and the flow in the circumferential direction at the minimum-width portion $W_{MIN}$ can be sufficiently controlled. Since the cycle λ is 100 times or smaller the amplitude a, water in the main groove 50 can pulse sufficiently and thus water which flows in the main groove 50 can be expelled outside the main groove 50.

In the present embodiment, since the cycle λ of the main groove 50 and the cycle λ of the main groove 60 are out of alignment by a half cycle, water which flows through the main groove 50 and the main groove 60 pulse alternately and is expelled alternately upon rotation of the tire.

In the present embodiment, since the tread length is 0.5 times or more the cycle λ of the main groove 50, the main groove 50 comes in contact along the circumferential direction R of the tire in the number enough to cause pulsation upon rotation of the tire. Thus, water which flows in the main groove 50 can be effectively expelled outside the main groove 50.

Since the tread length is 20 times or less the cycle λ of the main groove 50, the flows of water along the groove wall 10a and the groove wall 20a are produced in the main groove 50 and thereby water which flows in the main groove 50 can be expelled outside the main groove 50 effectively.

[Second Embodiment]

In the first embodiment described above, the groove wall 10a and the groove wall 20a are serpentine along the circumferential direction of the tire in the main groove 50 of the pneumatic tire 1 and the ratio $W_{MIN}/W_{MAX}$ is in the range of 35% to 85%: since water which flows in the main groove 50 can be periodically expelled outside the main groove 50, reduction in water expelling capability of the pneumatic tire 1 is controlled.

In the second embodiment, a structure in which wide-width portions are formed in a main groove and the wide-width portions include raised portions which are raised in the radial direction outside the tire will be described.

In particular, in the second embodiment, (2.1) Detailed Structure of Main groove and (2.2) Operation and Effect will be described with reference to FIGS. 3 to 5.

Figure 3:
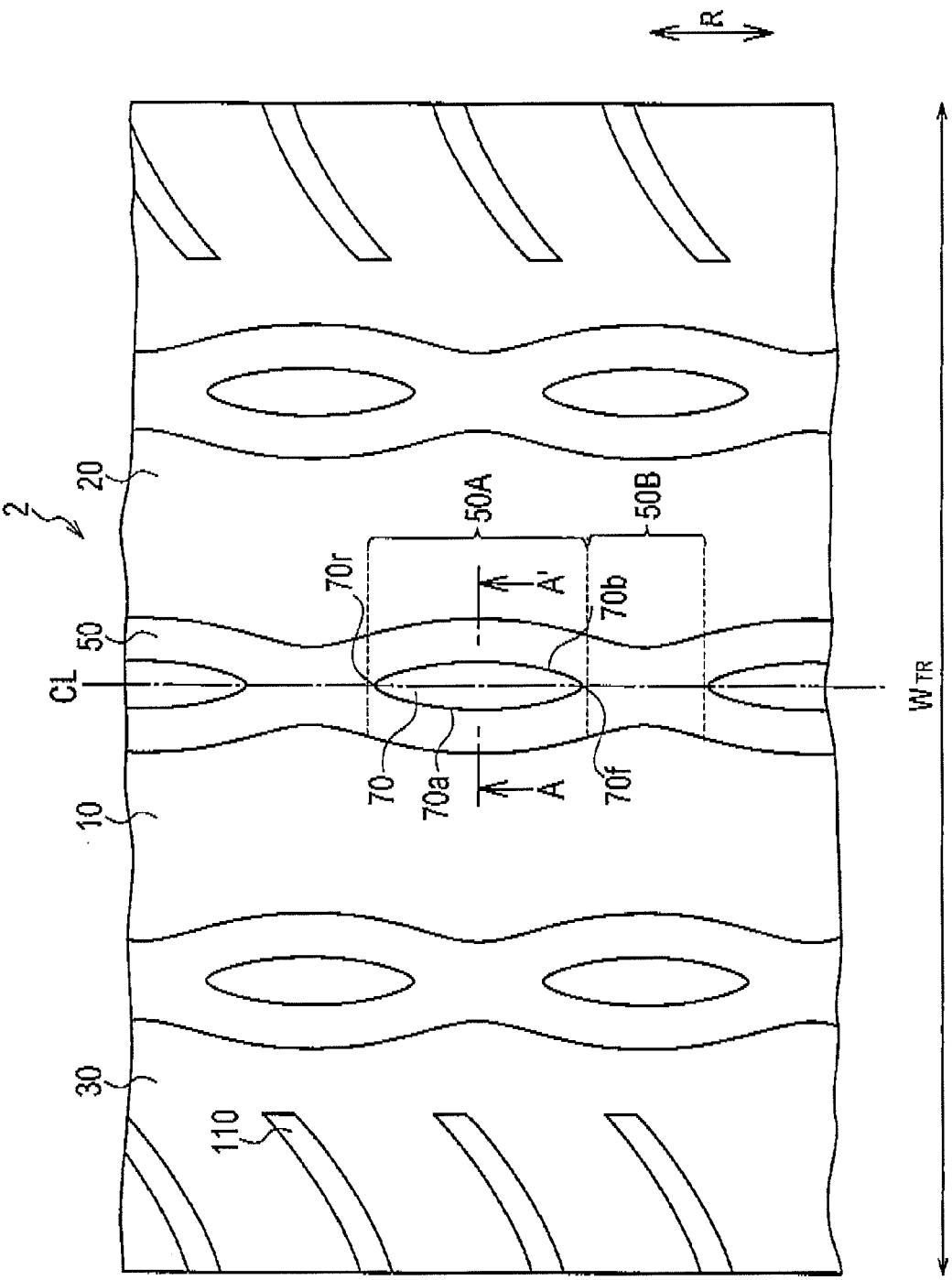
FIG. 3 is a developed view of a tread which constitutes a pneumatic tire according to a second embodiment of the present invention.

FIG. 3 is a developed view of a tread which constitutes a pneumatic tire 2 in the second embodiment. FIG. 4 is a partially sectioned perspective view illustrating the pneumatic tire 2 according to the second embodiment. FIG. 5 is a sectional view (a sectional view taken along line A-A' of FIG. 3 and FIG. 4) which illustrates the pneumatic tire 2 according to the second embodiment.

In the following second embodiment, points which are different from those of the first embodiment will be described mainly and repeated description will be omitted.

(2.1) Detailed Structure of Main Groove

As illustrated in FIG. 3, wide-width portions 50A which include the maximum-width portions $W_{MAX}$ are formed in a main groove 50. Similarly, narrow-width portions 50B which include the minimum-width portions $W_{MIN}$ are formed in the main groove 50. In the main groove 50, the wide-width portions 50A and the narrow-width portions 50B are formed alternately in the circumferential direction R of the tire.

Figure 4:
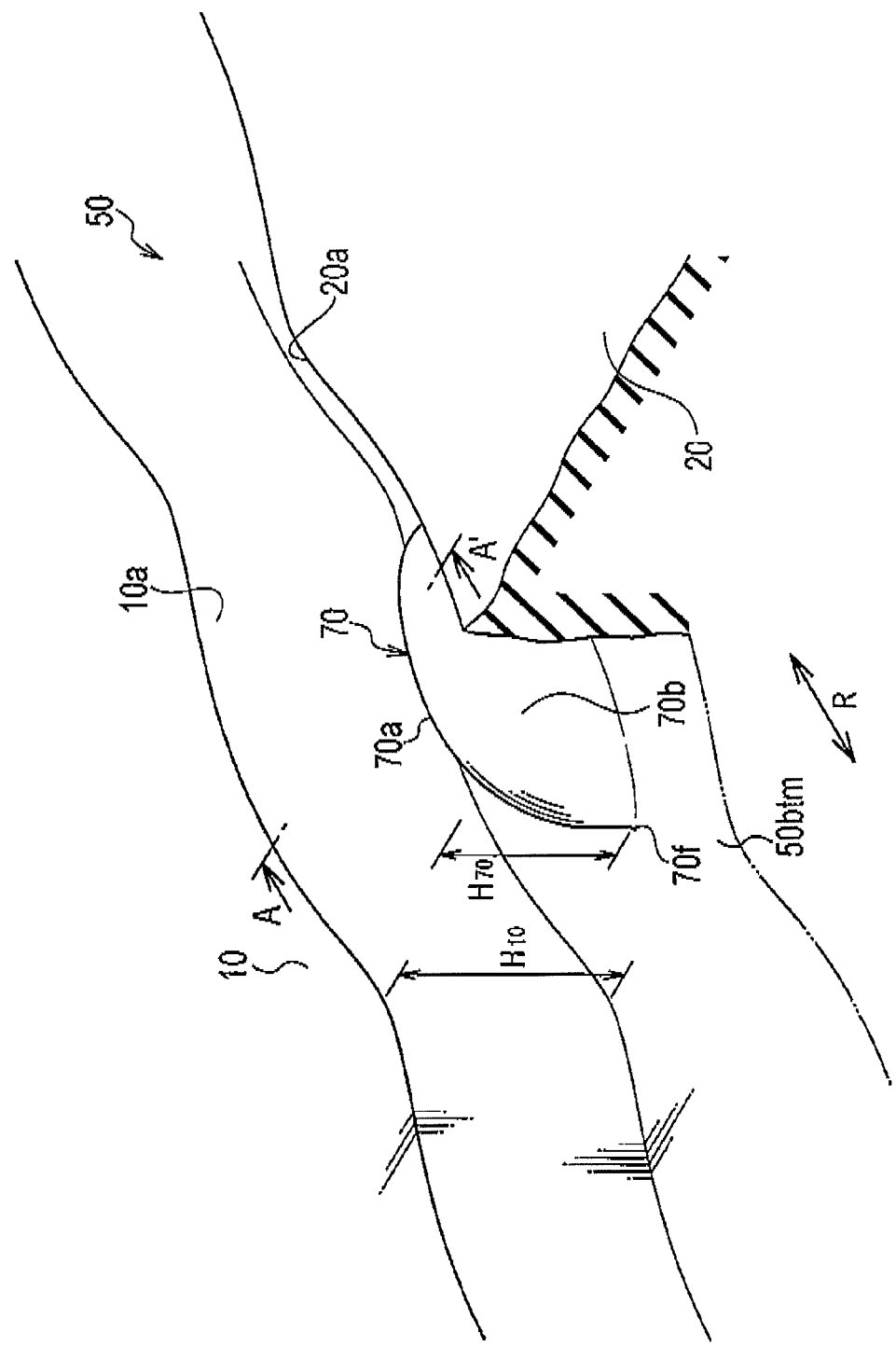
FIG. 4 is a partially enlarged view of a perspective view of the tread which constitutes the pneumatic tire according to the second embodiment of the present invention.

As illustrated in FIG. 4, raised portions 70 which are raised in the radial direction outside the tire are formed on a bottom portion 50btm which is a bottom portion of the main groove 50. The raised portions 70 are formed in the widened areas 50A.

The raised portions 70 are formed in an elongated shape along the circumferential direction R of the tire when seen from the plane of the tread surface. In particular, the raised portions 70 are tapered, when seen from the plane of the tread surface, toward front ends 70f and rear ends 70r which are ends in the circumferential direction R of the tire.

A side portion 70a of the raised portion 70 which faces the groove wall 10a which forms the main groove 50 extends along the groove wall 10a.

Similarly, a side portion 70b of the raised portion 70 which faces the groove wall 20a which forms the main groove 50 extends along the groove wall 20a.

The raised portions 70 are provided symmetrically about the center line of the main groove 50 when seen from the plane of the tread surface.

Figure 5:
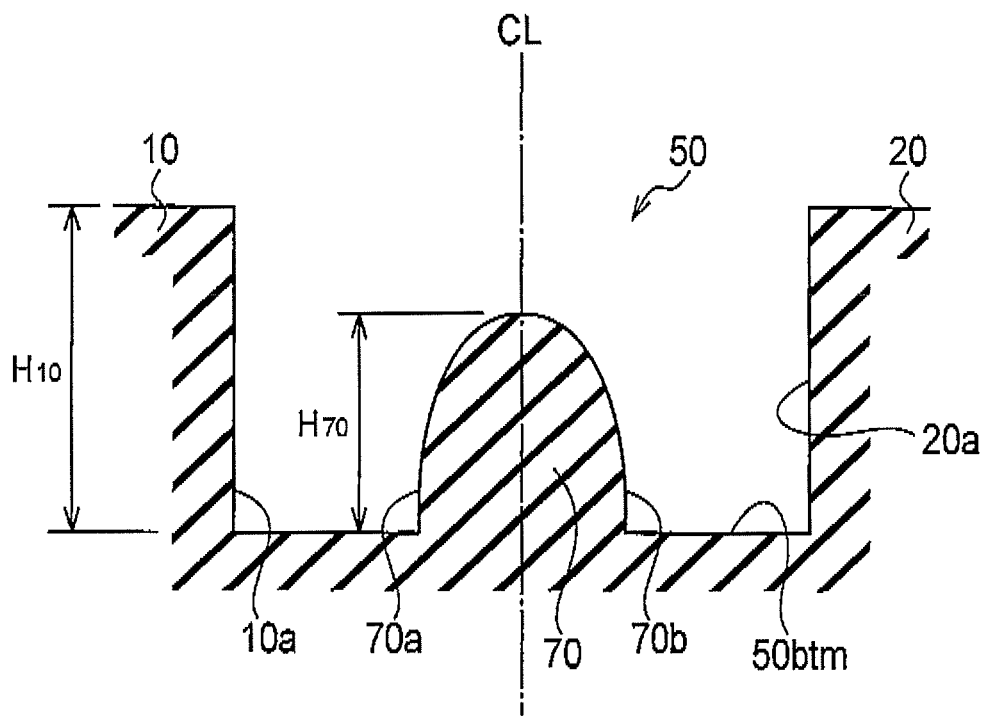
FIG. 5 is a partially sectioned view of the tread which constitutes the pneumatic tire according to the second embodiment of the present invention.

As illustrated in FIG. 5, the raised height $H_{70}$ which is the height of the raised portions 70 is the height along the radial direction of the tire from the bottom portion 50btm. The height $H_{70}$ of the raised portions is smaller than the depth $H_{10}$ of the main groove 50 which is the depth of the main groove 50.

(2.2) Operation and Effect

As described above, in the present embodiment, since the raised portions 70 are formed to be raised in the radial direction outside the tire on the bottom portion 50btm of the wide-width portion 50A including the maximum-width portion $W_{MAX}$, the raised portions 70 let water which flows in the wide-width portion 50A be easy to flow along the groove wall 10a and the groove wall 20a. That is, the raised portions 70 let water be expelled outside the main groove 50 and thus reduction in water expelling capability can be further controlled.

In the present embodiment, since the side portion 70a extends along the groove wall 10a and the side portion 70b extends along the groove wall 20a, water which flows in the wide-width portion 50A is further easy to flow along the groove wall 10a and the groove wall 20a. Accordingly, reduction in water expelling capability can be further controlled.

In the present embodiment, since the raised portions 70 are tapered, when seen from the plane of the tread surface, toward the front ends 70f and the rear ends 70r, water which flows in the wide-width portion 50A is easy to flow effectively along the groove wall 10a and the groove wall 20a without being interfered rapidly by the raised portions 70.

In the present embodiment, since the raised portions 70 are provided symmetrically about the center line of the main groove 50 when seen from the plane of the tread surface, the raised portions 70 let water which flows in the wide-width portion 50A be easy to flow uniformly along the groove wall 10a and the groove wall 20a.

In the present embodiment, since the height $H_{70}$ of the raised portions is smaller than the depth $H_{10}$ of the main groove, the flow of water along the circumferential direction R of the tire is sufficiently secured in the wide-width portion 50A.

[Comparative Evaluation]

Next, in order to further clarify effect of the present invention, an explanation about the comparative evaluation performed using the pneumatic tires related to the following Comparative Example and Examples will be given. In particular, (3.1) Method of Evaluation and (3.2) Evaluation Results will be described. It should be noted that the present invention is in no way limited by these Examples.

(3.1) Method of Evaluation

Hydroplaning performance was evaluated using three kinds of pneumatic tires. Data about the pneumatic tire was measured under the following conditions.

Tire size: 225/45R17
Rim and wheel size: 17×7J
Kinds of tire: normal tires (i.e., tires other than studless tires)
Vehicle type: domestic sedan
Loading condition: 600N+driver weight
Method of measurement: measure speed at which hydroplaning occurred at water depth of 10 mm The evaluation results are expressed as indices with the speed at which hydroplaning occurred in the pneumatic tire of Comparative Example set to 100.

Figure 6:
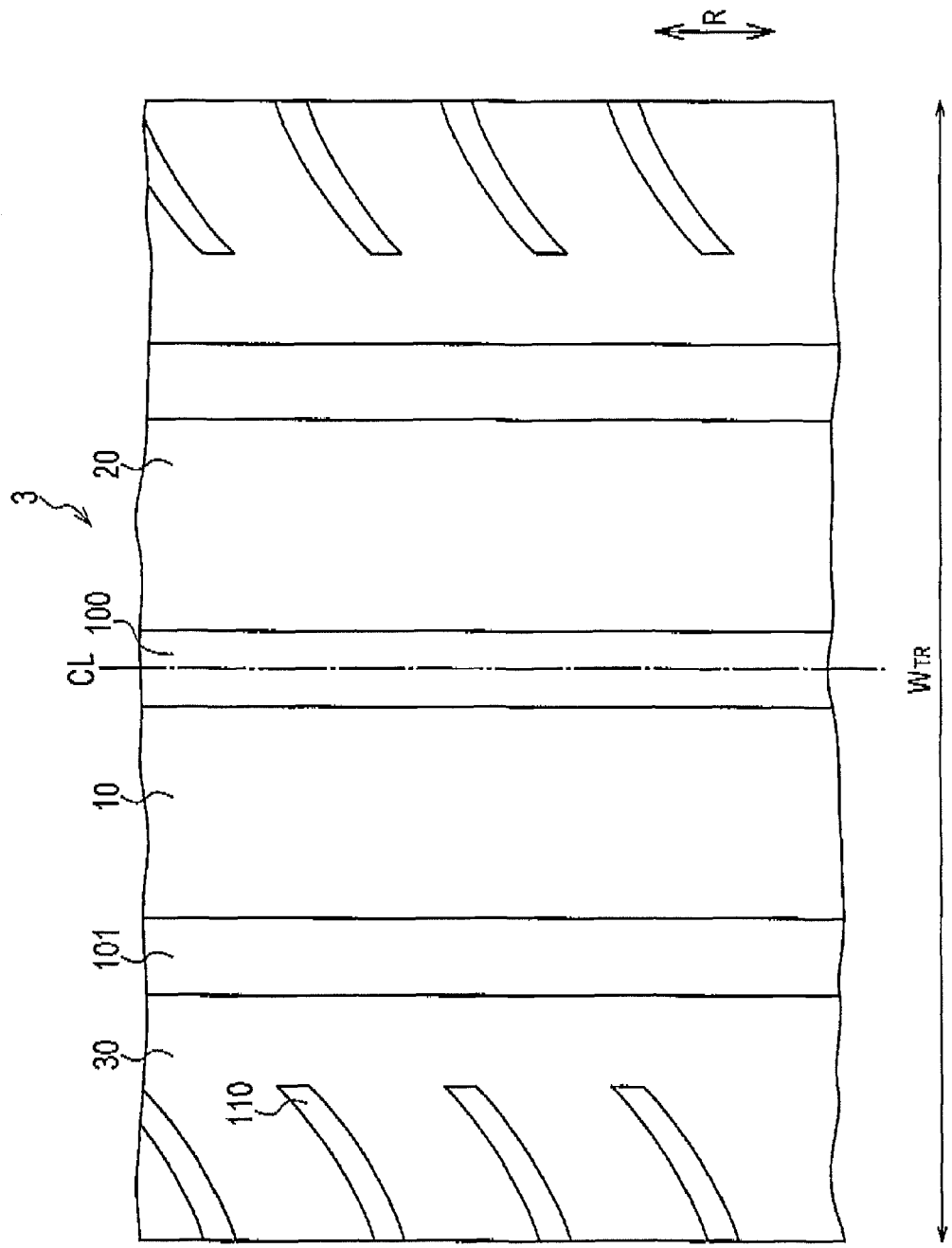
FIG. 6 is a developed view of a tread in a pneumatic tire in Comparative Example of the present invention.

A developed view of the tread of the pneumatic tire used in Comparative Example is illustrated in FIG. 6.

As illustrated in FIG. 6, a pneumatic tire 3 of Comparative Example differs from the pneumatic tires of Examples in the structures of a main groove 2100 and a main groove 2101.

In particular, groove walls which form the main groove 2100 and the main groove 2101 are not serpentine but are formed substantially linearly along the circumferential direction R of the tire: in this regard, these groove walls differ from the groove wall 10a of the main groove 50 of the pneumatic tire 1 of Example illustrated in FIG. 1.

(3.2) Evaluation Result

Evaluation results of each pneumatic tire will be explained with reference to Table 1.

TABLE 1

|  | COMPARATIVE EXAMPLE | EXAMPLE 1 | EXAMPLE 2 |
|---|---|---|---|
| TREAD (DEVELOPED VIEW) | FIG. 6 | FIG. 1 | FIG. 3 |
| HYDROPLANING PERFORMANCE | 100 | 102.3 | 103 |

The results show that the pneumatic tire 1 and the pneumatic tire 2 according to Examples 1 and 2 are provided with fine hydroplaning performance compared with the pneumatic tire 3 according to Comparative Example.

[Third Embodiment]

Hereinafter, a pneumatic tire according to a third embodiment will be described with reference to the drawings. In particular, (4.1) Structure of Pneumatic Tire, (4.2) Structure of Main grooves, (4.3) Structure of Raised Portion, (4.4) Structure of Lug Groove and (4.5) Operation and Effect will be described.

(4.1) Structure of Pneumatic Tire

Figure 7:
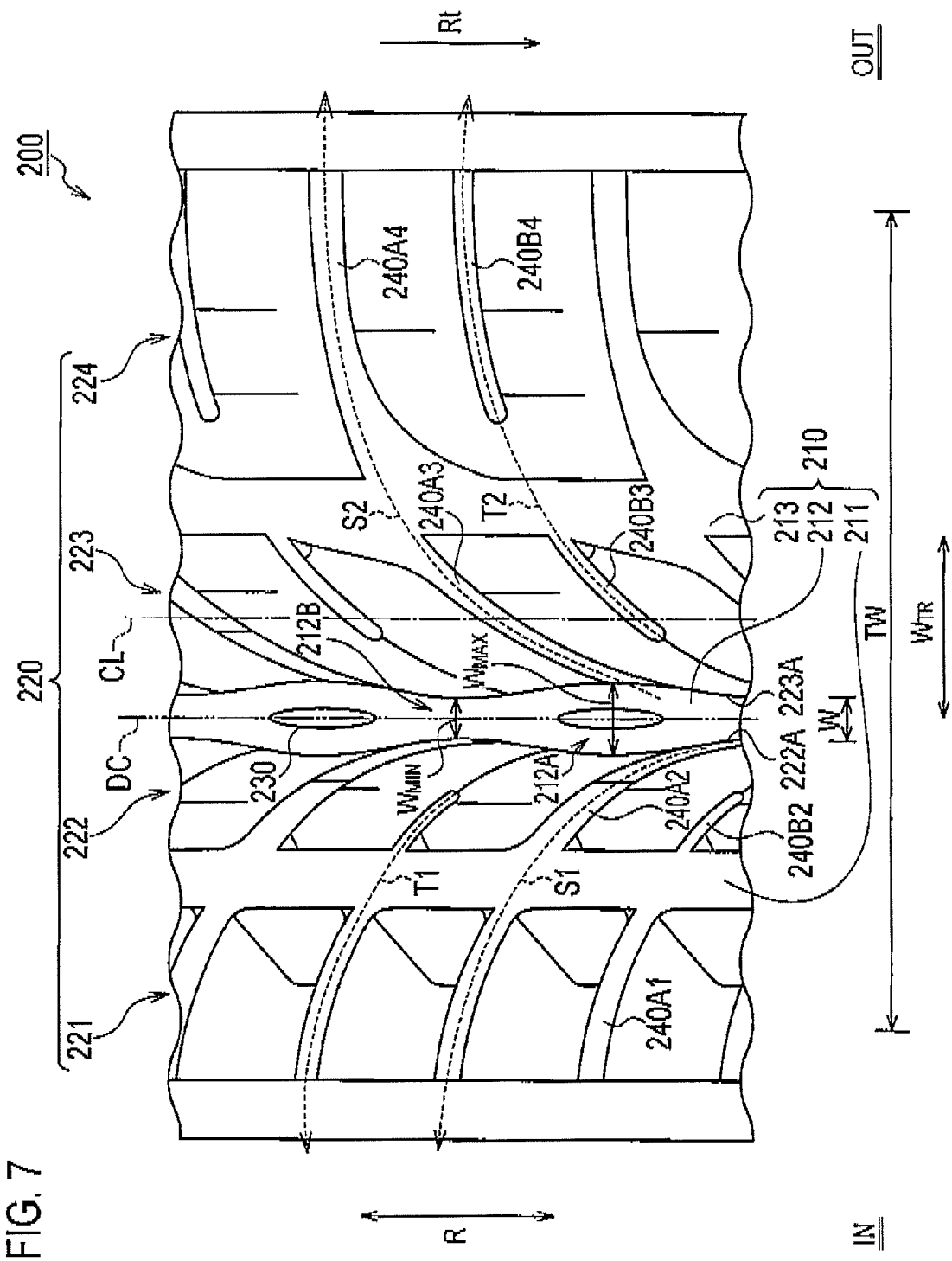
FIG. 7 is a developed view illustrating a tread pattern of a pneumatic tire according to a third embodiment.

A structure of a pneumatic tire 200 according to a third embodiment will be described with reference to the drawings. FIG. 7 is a developed view illustrating a tread pattern of the pneumatic tire 200 according to the third embodiment. In the pneumatic tire 200, the contact width TW of the tread with respect to the width direction $W_{TR}$ of the tread is 215 mm or greater.

As illustrated in FIG. 7, pneumatic tire 200 includes a plurality of land portions 220 formed by a plurality of main grooves 210 extending in the circumferential direction R of the tire. In particular, the plurality of main grooves 210 are constituted by a main groove 211, a main groove 212 and a main groove 213 in this order from inside IN (left in FIG. 7) toward outside OUT (right in FIG. 7) when seen from the direction in which the tire is mounted on a vehicle.

The main groove 211 extends linearly along the circumferential direction R of the tire. The main groove 211 is provided inside IN of an equator line CL of the tire when seen from the direction in which the tire is mounted on a vehicle.

The main groove 212 is a groove which most greatly contributes to water expelling performance among the plurality of main grooves 210. The main groove 212 has a groove width W along the width direction of the tread which varies along the circumferential direction of the tire. Raised portions 230 are formed on a bottom portion 112F of the main groove 212 to be raised outward in the radial direction of the tire.

The main groove 212 is provided inside IN of an equator line CL of the tire when seen from the direction in which the tire is mounted on a vehicle. The distance D from the equator line CL of the tire to the main groove 212 (i.e., the offset distance) is 9 to 25% of the contact width TW of the tread with respect to the width direction of the tread. Structures of the main groove 212 and the raised portions 230 will be described later.

The main groove 213 extends linearly along the circumferential direction of the tire. The main groove 213 has the groove width W along the width direction of the tread which varies along the circumferential direction of the tire depending on the shape of a land portion 223 or a land portion 224 which will be described later. The main groove 213 is provided outside OUT of an equator line CL of the tire when seen from the direction in which the tire is mounted on a vehicle.

The land portion 220 includes a land portion 221, a land portion 222, a land portion 223 and a land portion 224 in this order from inside IN toward outside OUT when seen from the direction in which the tire is mounted on a vehicle.

The land portion 221 is formed inside IN with respect to the main groove 211 when seen from the direction in which the tire is mounted on a vehicle. The land portion 222 is formed by the main groove 211 and the main groove 212. The land portion 223 is formed by the main groove 212 and the main groove 213. The land portion 224 is formed outside OUT with respect to the main groove 213 when seen from the direction in which the tire is mounted on a vehicle.

Lug grooves 240 extending in the width direction of the tread are formed in the land portion 220 (i.e., the land portion 221 to the land portion 224). The structure of the lug grooves 240 will be described later.

(4.2) Structure of Main Grooves

Figure 8:
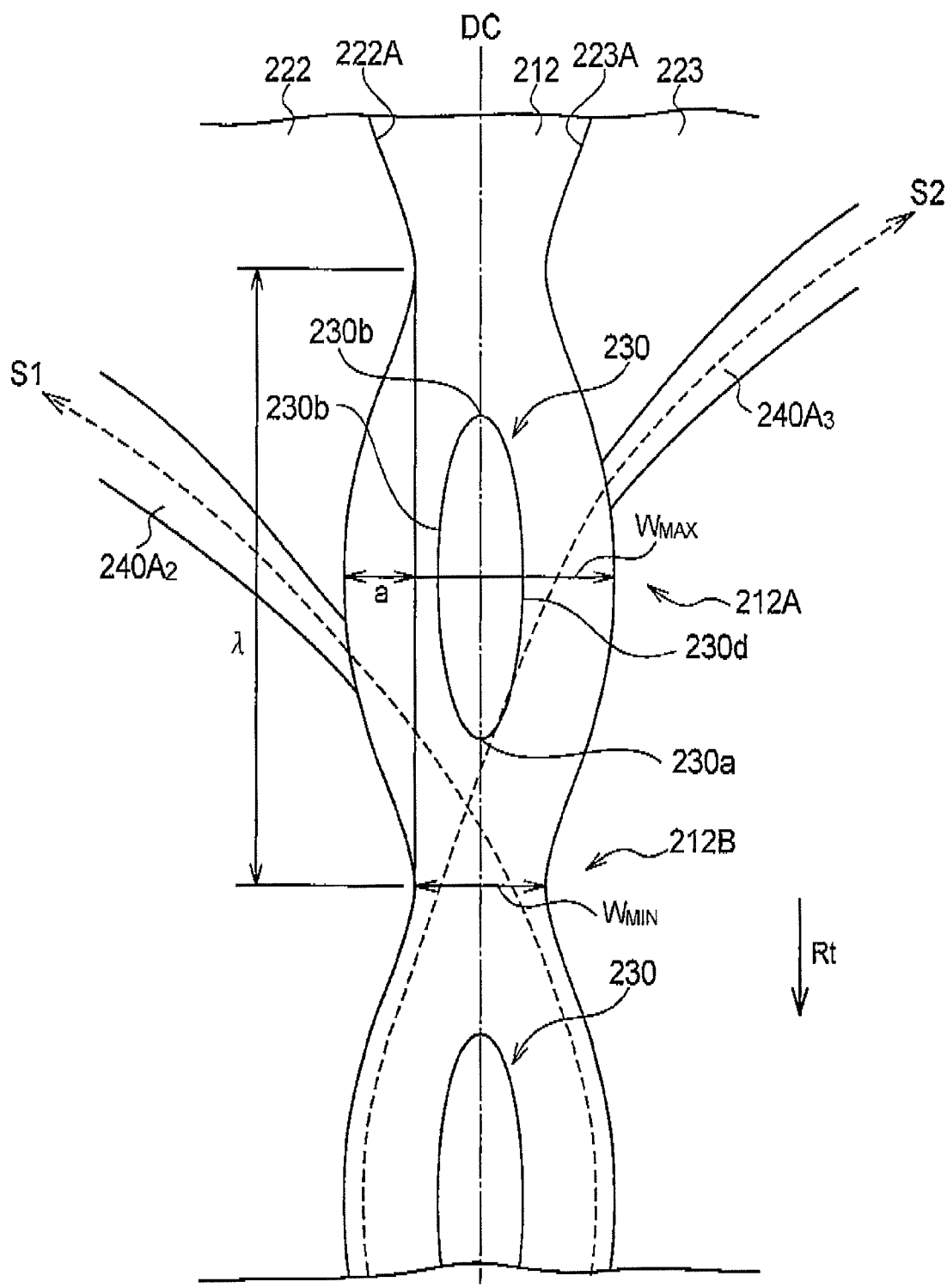
FIG. 8 is a developed view in which a neighborhood of a main groove is enlarged according to the third embodiment.

A structure of the above-described main groove 212, among the main groove 211 to the main groove 213, will be described with reference to the drawings. In particular, (4.2.1) Groove Walls which Forms Main groove 212 and (4.2.2) Groove Width W of Main groove 212 will be described. FIG. 8 is a developed view in which a neighborhood of the main groove 212 is enlarged according to the third embodiment.

(4.2.1) Groove Walls which Forms Main Groove 212

As illustrated in FIG. 7 and FIG. 8, the land portion 222 (the first land portion) situated inside IN of the main groove 212 when seen from the direction in which the tire is mounted on a vehicle includes a groove wall 222A (the first groove wall) which forms one of the wall surfaces of the main groove 212. The land portion 223 (the second land portion) situated outside OUT of the main groove 212 when seen from the direction in which the tire is mounted on a vehicle includes a groove wall 223A (the second groove wall) which forms one of the wall surface of the main groove 212.

The groove wall 222A and the groove wall 223A are serpentine in the circumferential direction of the tire when seen from the plane of the tread surface. The groove wall 222A and the groove wall 223A pass along center of main groove 212 to width direction of the tread, and are symmetrically provided to main groove center line DC extended along circumferential direction of the tire.

(4.2.2) Amplitude and Cycle of Main Groove 212

As illustrated in FIG. 7 and FIG. 8, the groove width W of the main groove 212 along the width direction of the tread varies in the predetermined repetition cycle along the circumferential direction of the tire. The groove width W of the main groove 212 represents the distance in the width direction of the tread from an arbitrary point on the groove wall 222A to the groove wall 223A.

Wide-width portions 212A and narrow-width portions 212B are provided in the main groove 212. The wide-width portions 212A include a maximum-width portion $W_{MAX}$ of the groove width W of the main groove 212 along the width direction of the tread. The narrow-width portions 212B, on the other hand, include a minimum-width portion $W_{MIN}$ of the groove width W of the main groove 212 along the width direction of the tread. The wide-width portions 212A and the narrow-width portions 212B are arranged alternately along the circumferential direction of the tire.

A ratio of the minimum-width portion $W_{MIN}$ of the groove width W of the narrow-width portions 212B and the maximum-width portion $W_{MAX}$ of the groove width W of the wide-width portions 212A satisfies a relation of $35\% \leq W_{MIN}/W_{MAX} \leq 85\%$.

The groove wall 222A and the groove wall 223A have a predetermined amplitude a along the width direction of the tread. The groove wall 222A and the groove wall 223A change in the cycle λ along the circumferential direction of the tire when seen from the plane of the tread surface. The groove wall 222A and the groove wall 223A are formed in symmetrical shapes in the front and rear directions of the rotational direction Rt of the tire about the maximum-width portion $W_{MAX}$ when the minimum-width portion $W_{MIN}$ is set to the starting point of the cycle λ.

The cycle λ of the groove wall 222A and the groove wall 223A in the circumferential direction of the tire is 15 times to 100 times the amplitude a. The tread length in the circumferential direction of the tire of the tread which comes in contact with the road surface is 0.5 to 20 times the cycle λ of the main groove 212 during rotation of the tire.

(4.3) Structure of Raised Portion

Next, a structure of the raised portions 230 according to the third embodiment will be described with reference to FIG. 7. FIG. 4 is applicable to the description of a section illustrating a neighborhood of the main groove 212 according to the third embodiment. FIG. 5 is applicable to the description of a section illustrating a neighborhood of the main groove 212 according to the third embodiment.

As illustrated in FIGS. 7 to 8, the raised portions 230 are formed in the wide-width portions 212A. The raised portions 230 are formed in an elongated shape along the circumferential direction of the tire when seen from the plane of the tread surface.

When seen from the plane of the tread surface, the raised portions 230 are tapered toward a front end 230a (the front end portion) in the front direction of the rotational direction Rt of the tire and toward a rear end 230b (the rear end portion) in the rear direction of the rotational direction Rt of the tire. Side portions 230c (the first side portion) of the raised portions 230 which face the groove wall 222A extend along the groove wall 222A. Side portions 230d (the second side portion) of the raised portions 230 which face the groove wall 223A extend along the groove wall 223A.

The raised portions 230 are provided symmetrically about the center line DC of the main groove when seen from the plane of the tread surface. The height H of the raised portions 230 is preferably smaller than the depth D of the main groove 212.

(4.4) Structure of Lug Grooves

Next, the structure of the lug grooves 240 according to the third embodiment will be described with reference to FIG. 7. As illustrated in FIG. 7, the lug grooves 240 are constituted by dividing lug grooves 240A and end lug grooves 240B. The dividing lug grooves 240A and the end lug grooves 240B are inclined with respect to the circumferential direction of the tire so as to extend toward the rotational direction Rt of the tire and outward in the width direction of the tread. The dividing lug grooves 240A and the end lug grooves 240B extend in a curved manner from the front to the rear in the rotational direction Rt of the tire.

The dividing lug grooves 240A divide the land portion 220 in the width direction of the tread and communicates with the main groove 210. The dividing lug grooves 240A are constituted by dividing lug grooves 240A1 formed in the land portion 221, dividing lug grooves 240A2 formed in the land portion 222, dividing lug grooves 240A3 formed in the land portion 223 and dividing lug grooves 240A4 formed in the land portion 224.

At least one ends of the end lug grooves 240B terminate at the land portion 220. The end lug grooves 240B are constituted by end lug grooves 240B2 formed in the land portion 222, end lug grooves 240B3 formed in the land portion 223 and end lug grooves 240B4 formed in the land portion 224. No end lug groove 240B is formed in the land portion 221.

Here, the dividing lug grooves 240A2 and the dividing lug grooves 240A3 communicate with the wide-width portion 212A. Especially, either one of the dividing lug grooves 240A2 and the dividing lug grooves 240A3 are preferably provided on an extension line EX along the groove wall 222A and the groove wall 223A which form the maximum-width portion $W_{MAX}$ of the groove width of the wide-width portion 212A from the groove wall 222A and the groove wall 223A which form the minimum-width portion $W_{MIN}$ of the groove width of the narrow-width portion 212B. The dividing lug grooves 240A2 and the dividing lug grooves 240A3 are provided asymmetrically about the center line DC of the main groove in order to mitigate noise.

The dividing lug grooves 240A1 are provided along extension lines S1 along the extending direction of the dividing lug grooves 240A2. The dividing lug grooves 240A4 are provided along extension lines S2 along the extending direction of the dividing lug grooves 240A3.

The end lug grooves 240B2 are provided between the dividing lug grooves 240A2 which are adjacent to each other in the circumferential direction of the tire. The end lug grooves 240B1 are provided along extension lines T1 along the extending direction of the end lug grooves 240B2. The end lug grooves 240B3 are provided between the dividing lug grooves 240A3 which are adjacent to each other in the circumferential direction of the tire. The end lug grooves 240B4 are provided along extension lines T2 along the extending direction of the end lug grooves 240B3.

(4.5) Operation and Effect

In the third embodiment described above, the groove wall 222A and the groove wall 223A are serpentine in the circumferential direction of the tire when seen from the plane of the tread surface and the groove width W of the main groove 212 changes in predetermined cycle λ along the circumferential direction of the tire. According to this, a flow of water along the serpentine shape of the groove wall 222A and the groove wall 223A is produced in the main groove 212. Water flowing in the main groove 212 pulses in the predetermined cycle λ and is easy to be expelled in the direction of the extension lines of the streamlines along the groove wall 222A and the groove wall 223A from the maximum-width portion $W_{MAX}$ toward the minimum-width portion $W_{MIN}$. Therefore, water expelling performance to expel water trapped between the road surface and the tread can be improved further reliably.

The main groove 212 described above is provided inside IN of the equator line CL of the tire when seen from the direction in which the tire is mounted on a vehicle. According to this, in a case in which the tire is mounted on the vehicles in which a negative camber angle is set, the main groove 212 is situated near the center on the contact surface of the tread which is in contact with the road surface. Therefore, water expelling performance can be further improved as compared with a case in which the main groove 212 is situated on the equator line CL of the tire.

In addition, the lug grooves 240 are formed in at least one of the land portion 222 and the land portion 223. According to this, water trapped between a wheel tread (which is a surface of the land portion 222 or the land portion 223) of the tread and the road surface flows into the lug grooves 240 and is easier to be expelled outward in the width direction of the tread as compared with a case in which no lug groove is formed. Especially the lug grooves 240, which communicate with the main groove 212, promotes reliable expulsion outward in the width direction of the tread. Therefore, water expelling performance can be improved further reliably.

As described above, since water expelling performance can be improved reliably, occurrence of hydroplaning can be controlled as a result.

In the third embodiment, the ratio of the minimum-width portion $W_{MIN}$ of the groove width W of the main groove 212 and the maximum-width portion $W_{MAX}$ of the groove width W of the main groove 212, i.e., $W_{MIN}/W_{MAX}$, is in a range of 35% to 85%. According to this, water which flows along the groove wall 222A and the groove wall 223A passes through the maximum-width portion $W_{MAX}$ and then, as the groove width W of the main groove 212 decreases, is easy to be expelled at the minimum-width portion $W_{MIN}$ in the direction of the extension lines of the streamlines along the groove wall 222A and the groove wall 223A. That is, water in the main groove is easy to be directed outward in the width direction of the tread. Therefore, water expelling performance can be improved further reliably.

Since the ratio $W_{MIN}/W_{MAX}$ is 35% or more, the flow along the groove wall 222A and the groove wall 223A and the flow along the circumferential direction of the tire do not concentrate excessively at the minimum-width portion $W_{MIN}$ and reduction in water expelling capability can be controlled further reliably. Since, on the other hand, the ratio $W_{MIN}/W_{MAX}$ is 85% or less, water in the main groove 212 is easy to pulse and thus water expelling performance can be improved further reliably.

In the third embodiment, the lug grooves 240 (the dividing lug grooves 240A2 and the dividing lug grooves 240A3) communicate the wide-width portion 212A. According to this, water which flows along the groove wall 222A and the groove wall 223A passes through the maximum-width portion $W_{MAX}$ and then, as the groove width W of the main groove 212 decreases, is easy to be expelled at the minimum-width portion $W_{MIN}$ in the direction of the extension lines of the streamlines along the groove wall 222A and the groove wall 223A. That is, water in the main groove 212 is easy to be directed outward in the width direction of the tread.

In the third embodiment, the distance D from the equator line CL of the tire to the main groove 212 (i.e., the offset distance) is 9 to 25% of the contact width TW of the tread with respect to the width direction of the tread. According to this, the main groove 212 is situated near the center on the contact surface of the tread which is in contact with the road surface so as to allow setting of various camber angles. It is therefore possible to manufacture the pneumatic tire 200 corresponding to various camber angles.

With the distance D being 9% or larger and 25% or smaller with respect to the contact width TW of the tread, the main groove 212 is easy to be situated near the center of the contact surface of the tread which is in contact with the road surface in a state in which the camber angle is set, and thus it is easy to control reduction in water expelling performance.

In the third embodiment, the cycle λ is 15 times to 100 times the amplitude a. According to this, since water which flows in the main groove 212 can be effectively expelled outside the main groove 212, water expelling performance can be improved further reliably.

With the cycle λ being more than 15 times the amplitude a, excessive concentration of the flow along the groove wall 222A and the groove wall 223A and the flow in the circumferential direction of the tire at the minimum-width portion $W_{MIN}$ can be sufficiently controlled. With the cycle λ being 100 times or less the amplitude a, on the other hand, water in the main groove 212 can pulse sufficiently and water which flows in the main groove 212 can be effectively expelled outside the main groove 212.

In the third embodiment, the raised portions 230 which are raised outward in the radial direction of the tire are formed in the bottom portion 112F in the wide-width portion 212A of the main groove 212. According to this, the raised portions 230 let water which flows in the wide-width portion 212A be easy to flow along the groove wall 222A and the groove wall 223A. That is, the raised portions 230 let water which flows in the wide-width portion 212A be easy to be expelled into the lug grooves 240 (the dividing lug grooves 240A2 and the dividing lug grooves 240A3). Thus, water which flows in the wide-width portion 212A can be expelled efficiently and water expelling performance can be improved further reliably.

In the third embodiment, the side portions 230c of the raised portions 230 which face the groove wall 222A extend along the groove wall 222A and the side portions 230c of the raised portions 230 which face the groove wall 223A extend along the groove wall 223A. According to this, water which flows in the wide-width portion 212A is further easy to flow along the groove wall 222A and the groove wall 223A.

In the third embodiment, the raised portions 230 are tapered toward the front end 30a in the rotational direction Rt of the tire and the rear end 30b in the rotational direction Rt of the tire when seen from the plane of the tread surface. According to this, water which flows in the wide-width portion 212A is easy to flow effectively along the groove wall 222A and the groove wall 223A without being interfered rapidly by the raised portions 230.

In the third embodiment, the raised portions 230 are provided symmetrically about the center line DC of the main groove when seen from the plane of the tread surface. According to this, the raised portions 230 let water which flows in the wide-width portion 212A be easy to flow uniformly along the groove wall 222A and the groove wall 223A.

In the third embodiment, the height H of the raised portions 230 is smaller than the depth D of the main groove 212. According to this, the flow of water along the circumferential direction of the tire is sufficiently secured in the wide-width portion 212A as compared with a case in which the height H of the raised portions 230 is greater than the depth D of the main groove 212.

[Fourth Embodiment]

Hereinafter, a pneumatic tire 200A according to a fourth embodiment according to the present invention will be described with reference to the drawings. In the pneumatic tire 200A according to the fourth embodiment, many main grooves 210 and land portions 220 of the pneumatic tire 1 according to the third embodiment are provided. In particular, (5.1) Structure of Pneumatic Tire, (5.2) Structure of Lug Grooves and (5.3) Operation and Effect will be described. The same reference numerals are given to the same portions as those of the pneumatic tire 200 according to the third embodiment described above, and different portions will be described mainly.

(5.1) Structure of Pneumatic Tire

A structure of a pneumatic tire 200A according to the fourth embodiment will be described with reference to the drawings. FIG. 5 is a developed view illustrating a tread pattern of the pneumatic tire 200A according to the fourth embodiment. In the pneumatic tire 200A, the contact width TW of the tread with respect to the width direction $W_{TR}$ of the tread is 303 mm or greater.

Figure 9:
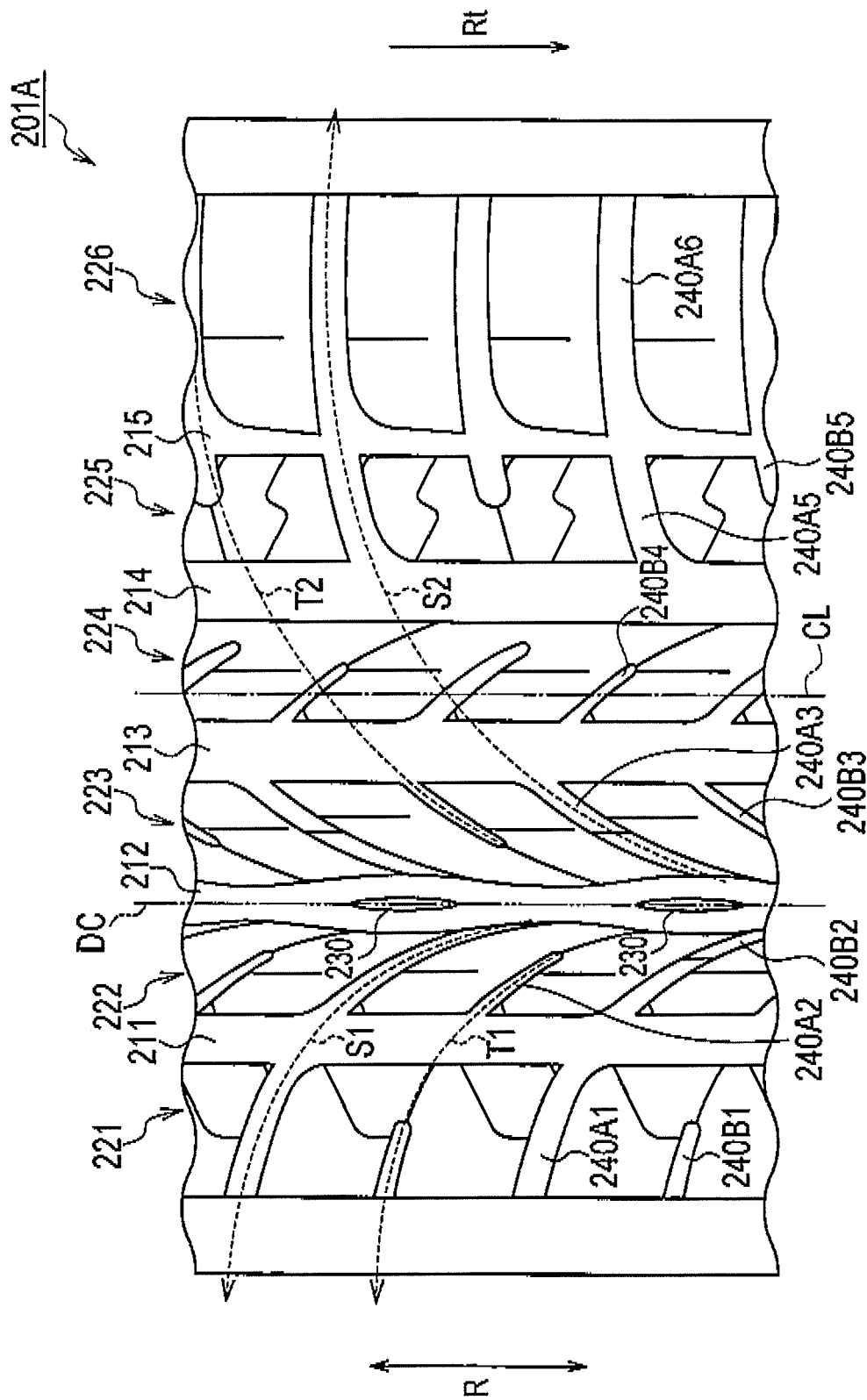
FIG. 9 is a developed view illustrating a tread pattern of a pneumatic tire according to a fourth embodiment.

As illustrated in FIG. 9, a main groove 210 is constituted by a main groove 211, a main groove 212, a main groove 213, a main groove 214 and a main groove 215 in this order from inside IN toward outside OUT when seen from the direction in which the tire is mounted on a vehicle. The main groove 214 and the main groove 215 extend linearly along the circumferential direction of the tire. Other structure of the main grooves 210 is the same as the details described in the third embodiment.

A land portion 220 includes a land portion 221, a land portion 222, a land portion 223, a land portion 224, a land portion 225 and a land portion 226 in this order from inside IN toward outside OUT when seen from the direction in which the tire is mounted on a vehicle. The land portion 225 is formed by a main groove 214 and a main groove 215. The land portion 226 is formed outside OUT with respect to the main groove 215 when seen from the direction in which the tire is mounted on a vehicle. Other structure of the land portions 220 is the same as the details described in the third embodiment.

(5.2) Structure of Lug Grooves

Next, the structure of the lug grooves 240 according to the present embodiment will be described with reference to FIG. 5. As illustrated in FIG. 9, the lug grooves 240 are constituted by dividing lug grooves 240A and end lug grooves 240B. The dividing lug grooves 240A and the end lug grooves 240B are inclined with respect to the circumferential direction of the tire. The dividing lug grooves 240A and the end lug grooves 240B extend in a curved manner from the front to the rear in the rotational direction Rt of the tire.

The dividing lug grooves 240A are constituted by, in addition to the dividing lug grooves 240A1, the dividing lug grooves 240A2 and the dividing lug grooves 240A3, dividing lug grooves 240A5 formed in the land portion 225 and dividing lug grooves 240A6 formed in the land portion 226. No dividing lug groove 240A is formed in the land portion 224.

The end lug grooves 240B are constituted by, in addition to the end lug grooves 240B2, the end lug grooves 240B3 and the end lug grooves 240B4, end lug grooves 240B1 formed in the land portion 221 and end lug grooves 240 B5 formed in the land portion 225. No end lug groove 240B is formed in the land portion 226.

The dividing lug grooves 240A5 and the dividing lug grooves 240A6 are provided along extension lines S2 along the extending direction of the dividing lug grooves 240A3. That is, the end lug grooves 240B4 intersect the extension lines S2 and extend in a curved manner in the direction opposite to the extension lines S2.

(5.3) Operation and Effect

In the fourth embodiment, as in the third embodiment, since water expelling performance to expel water trapped between the road surface and the tread can be improved further reliably, occurrence of hydroplaning can be controlled as a result. Especially, since the pneumatic tire 200A has a contact width TW of the tread wider than that of the pneumatic tire 200 according to the third embodiment, the effect described above is significant.

(6) Comparative Evaluation

Next, in order to further clarify effect of the present invention, an explanation about the comparative evaluation performed using the pneumatic tires related to the following Comparative Example and Examples will be given. In particular, (6.1) Structure of Each Pneumatic Tire and (6.2) Evaluation Results will be described with reference to Table 2. It should be noted that the present invention is in no way limited by these Examples.

TABLE 2

| | FRONT WHEEL | | | REAR WHEEL | | |
|---|---|---|---|---|---|---|
| | COMPARATIVE EXAMPLE 1 | COMPARATIVE EXAMPLE 2 | EXAMPLE | COMPARATIVE EXAMPLE 1 | COMPARATIVE EXAMPLE 2 | EXAMPLE |
| TIRE SIZE | | 245/55R13 | | | 325/45R13 | |
| DEPTH OF MAIN GROOVE (FRONT WHEEL, REAR WHEEL) | | 5 mm | | | 4.7 mm | |
| RATIO OF GROOVE TO CONTACT WIDTH OF TREAD (FRONT WHEEL, REAR WHEEL) | | 37% | | | 41% | |
| MOUNTING ANGLE OF TIRE | | SA→0° CA→-3° | | | SA→0°CA→-2° | |
| POSITION OF MAIN GROOVE WHICH MOST GREATLY CONTRIBUTES TO WATER EXPELLING PERFORMANCE | ON EQUATOR LINE OF TIRE | INSIDE SEEN FROM DIRECTION IN WHICH TIRE IS MOUNTED ON VEHICLE | INSIDE SEEN FROM DIRECTION IN WHICH TIRE IS MOUNTED ON VEHICLE | ON EQUATOR LINE OF TIRE | INSIDE SEEN FROM DIRECTION IN WHICH TIRE IS MOUNTED ON VEHICLE | INSIDE SEEN FROM DIRECTION IN WHICH TIRE IS MOUNTED ON VEHICLE |

TABLE 2-continued

| HYDROPLANING OCCURRING SPEED (INDEX) | 100.7 km/h(100.0) | 100.1 km/h(100.3) | 102.2 km/h(101.5) | 102.5 km/h(100.0) | 103.1 km/h(100.6) | 105.6 km/h(103.0) |
|---|---|---|---|---|---|---|

(6.1) Structure of Each Pneumatic Tire

In a pneumatic tire according to Comparative Example 1, a linear groove (for example, a wide groove) which most greatly contributes to water expelling performance among a plurality of main grooves is provided on the equator line CL of the tire. In a pneumatic tire according to Comparative Example 2, a linear groove (for example, a wide groove) which most greatly contributes to water expelling performance among a plurality of main grooves is provided inside IN with respect to the equator line CL of the tire when seen from the direction in which the tire is mounted on a vehicle.

In the pneumatic tire according to the Examples, the main groove 212 which most greatly contributes to water expelling performance among the main grooves 210 is provided inside IN with respect to the equator line CL of the tire when seen from the direction in which the tire is mounted on a vehicle. The pneumatic tire 200 described in the third embodiment is used as a front wheel and the pneumatic tire 200A described in the fourth embodiment is used as a rear wheel.

(6.2) Evaluation Result

A vehicle on which each of the pneumatic tires is mounted is made to run at a speed of 80 km/h. The speed is increased while only the right wheel mounted on the vehicle is running on a rainy road at a depth of 10 mm. The speed at which speed difference (i.e., a skid) between the right and left wheels mounted on the vehicle occurs is set to "hydroplaning occurring speed." Measurement was made five times and an average speed was measured excluding the maximum and minimum values.

As a result, as illustrated in Table 2, the vehicle on which the pneumatic tire according to Examples is mounted had higher hydroplaning occurring speed than that of the vehicle on which the pneumatic tire according to Comparative Examples 1 and 2 is mounted, and thus can control the occurrence of hydroplaning.

[Other Embodiments]

As described above, the details of the present invention have been disclosed with reference to the embodiments of the present invention; it should not be understood, however, that the description and the drawings which make a part of the disclosure not at all limit the present invention. Various alternative embodiments, Examples and operational techniques will be obvious to those skilled in the art from this disclosure.

For example, the embodiments of the present invention can be changed as follows.

The groove wall 10a and the groove wall 20a are serpentine in a repetitive manner along the circumferential direction R of the tire when seen from the plane of the tread surface in the embodiments described above; however, it is not necessary that the groove wall 10a and the groove wall 20a are serpentine in a repetitive manner and may be provided, for example, linearly along the circumferential direction R of the tire.

In the embodiments described above, the groove wall 10a and the groove wall 20a change in a predetermined repetition cycle along the circumferential direction R of the tire when seen from the plane of the tread surface, and are provided symmetrically in the front and rear direction about the maximum-width portion $W_{MAX}$ within a cycle. It is not necessary, however, that the groove wall 10a and the groove wall 20a are provided symmetrically in the front and rear direction about the maximum-width portion $W_{MAX}$ within a cycle; for example, the groove wall 10a and the groove wall 20a may be provided in a shape in which the groove width is rapidly reduced on the rear side.

It has been described that the contact width TW of the tread of the pneumatic tire 100 is 215 mm or greater in the third embodiment and the contact width TW of the tread to width direction of the tread of the pneumatic tire 100A is 303 mm or greater in the fourth embodiment; however, these are not restrictive and the contact width TW of the tread with respect to the width direction of the tread may be smaller than 215 mm and 303 mm.

It has been described in the embodiments that a plurality of land portions 220 are formed by a plurality of main grooves 210; however, this is not restrictive and two land portions 220 may be formed by at least one main groove 210.

Figure 10:
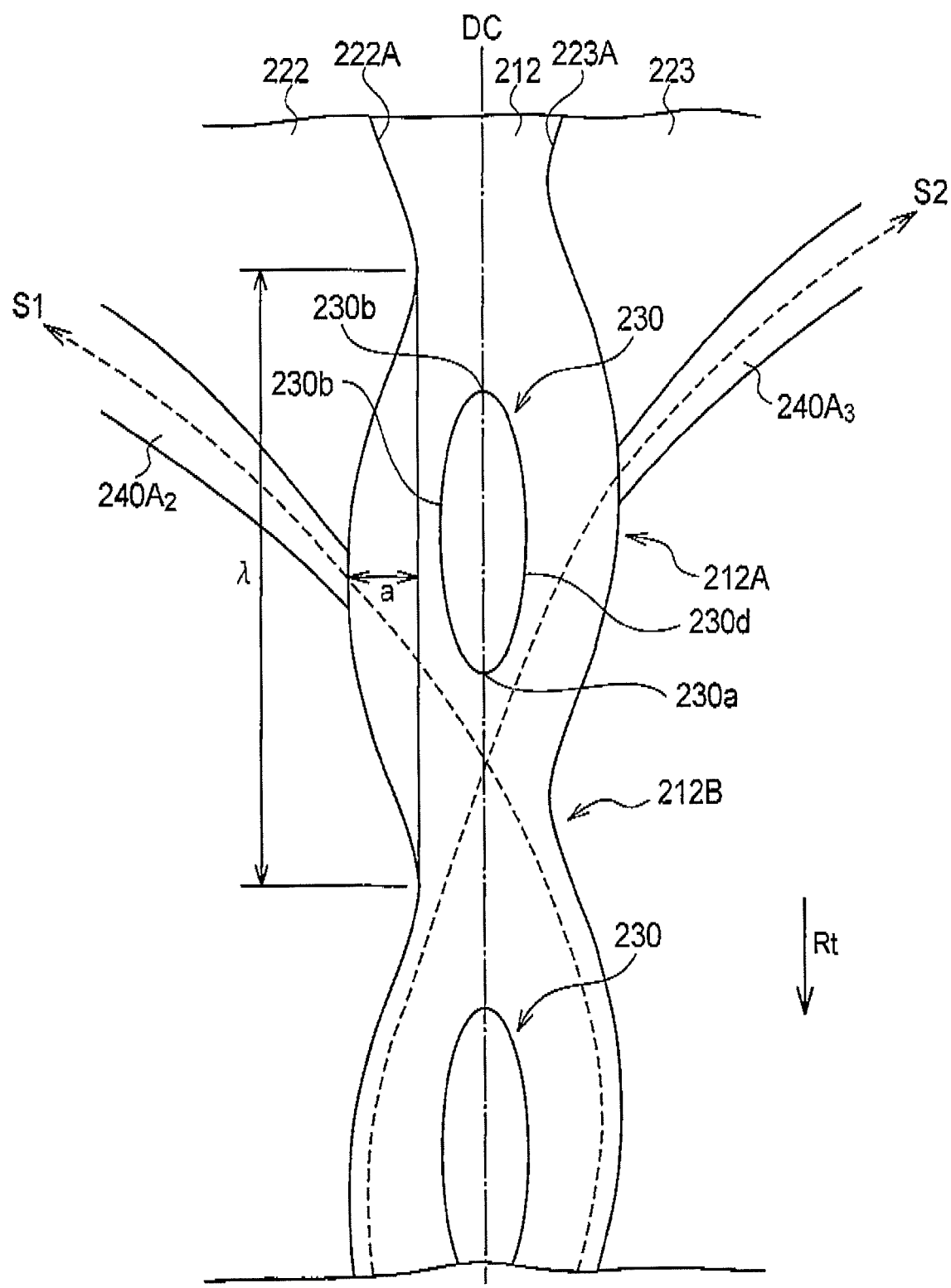
FIG. 10 is a developed view in which a neighborhood of a main groove is enlarged according to the fourth embodiment.

It has been described in the embodiments that the groove wall 222A and the groove wall 223A are provided symmetrically about the center line DC of the main groove; however, this is not restrictive and the groove wall 222A and the groove wall 223A may be provided asymmetrically about the center line DC of the main groove as illustrated in FIG. 10.

It has been described in the embodiments that only the groove width W of the main groove 212 which most greatly contributes to water expelling performance among a plurality of main grooves 210 varies in a predetermined repetition cycle along the circumferential direction of the tire; however, this is not restrictive and the rest of the main grooves 210 may also vary in a predetermined repetition cycle along the circumferential direction of the tire.

It has been described in the embodiments that the main groove 212 which most greatly contributes to water expelling performance among a plurality of main grooves 210 is provided inside IN with respect to the equator line CL of the tire when seen from the direction in which the tire is mounted on a vehicle; however, this is not restrictive and the major groove 212 may be provided It may be provided outside OUT with respect to the equator line CL of the tire when seen from the direction in which the tire is mounted on a vehicle. This case is effective when the tire is mounted on a vehicle in which a positive camber angle is set.

It has been described in the embodiments that the raised portions 230 are provided on the bottom portion (not illustrated) of the main groove 212; however, this is not restrictive and no raised portion 230 may be provided. The shape of the raised portion 230 may be suitably changed according to the purpose.

It has been described in the embodiments that the lug grooves 240 are constituted by the dividing lug grooves 240A and the end lug grooves 240B; however, this is not restrictive and either of the dividing lug grooves 240A or the end lug grooves 240B may be provided.

It has been described in the embodiments that the dividing lug grooves 240A and the end lug grooves 240B are inclined with respect to the circumferential direction of the tire; however, this is not restrictive and the dividing lug grooves 240A and the end lug grooves 240B may be provided along the width direction of the tread. The dividing lug grooves 240A and the end lug grooves 240B do not necessarily extend in a curved manner but may extend linearly.

It has been described in the embodiments that the dividing lug grooves 240A2 and the dividing lug grooves 240A3 communicate with the wide-width portion 212A; however, this is not restrictive and it is not necessary that the dividing lug grooves 240A and the end lug grooves 240B communicate with the wide-width portion 212A.

It has been described in the embodiments that the dividing lug groove 240A2 and the dividing lug groove 240A3 communicate with the main groove 212 (wide-width portion 212A); however, this is not restrictive and, for example, one ends of the end lug grooves 240B may communicate with the main groove 212. It is not necessary that the dividing lug grooves 240A2 and the dividing lug grooves 240A3 communicate with the wide-width portion 212A; however, the dividing lug grooves 240A2 and the dividing lug grooves 240A3 may be situated close to the wide-width portion 212A or may communicate with or may be situated close to the narrow-width portion 212B.

It has been described in the embodiments that the dividing lug groove 240A2 and the dividing lug groove 240A3 are provided asymmetrically about the center line DC of the main groove in order to mitigate noise; however, this is not restrictive and the dividing lug groove 240A2 and the dividing lug groove 240A3 may be provided symmetrically about the center line DC of the main groove. Thus, the shape of the lug grooves 240 may be suitably changed according to the purpose.

Thus, the present invention of course includes, for example, various embodiments which are not described herein. Accordingly, the technical scope of the present invention is defined only by the matter to define the invention related to claims which are reasonable on the basis of the above description.

Japanese Patent Application No. 2009-027705 (filed Feb. 9, 2009) and Japanese Patent Application No. 2009-139242 (filed Jun. 10, 2009) are incorporated by reference in the description of the present application in their entity.

INDUSTRIAL APPLICABILITY

According to the present invention, since the number of the transverse grooves which intersect the main groove can be minimized and reduction in water expelling capability can be controlled, the present invention can be applied to pneumatic tires which are excellent in design and appearance.

1,2 . . . pneumatic tire, 10,20,30 . . . land portion, 10a,20a . . . groove wall, 50,60 . . . main groove, 50btm . . . bottom portion, 110 . . . transverse groove, 51A . . . wide-width groove portion, 51B . . . narrow-width portion, 70 . . . raised portion, 70a,70b . . . side portion, 70f . . . front end, 70r . . . rear end, 200,200A . . . pneumatic tire, 210(211-215) . . . main groove, 212A . . . wide-width groove portion, 212B . . . narrow-width portion, 212F . . . bottom portion, 230a . . . front end, 230b . . . rear end, 230c,230d . . . side portion, 240 . . . lug groove, 240A (240A1-240A6) . . . dividing lug groove, 240B(240B1-240B5) . . . end lug groove

The invention claimed is:

1. A pneumatic tire which comprises:
a first land portion which extends along a circumferential direction of the tire and comes in contact with a road surface;
a second land portion which extends along the circumferential direction of the tire and comes in contact with the road surface;
a closed lug groove which extends in a width direction of a tread of the tire and is formed in the first land portion;
an opened lug groove which extends in a width direction of the tread of the tire and is formed in the second land portion; and
a main groove which extends along the circumferential direction of the tire and is formed between the first land portion and the second land portion,
wherein:
the first land portion includes a first groove wall which forms the main groove;
the second land portion includes a second groove wall which forms the main groove;
the first groove wall and the second groove wall are serpentine along the circumferential direction of the tire when seen from a plane of the tread surface;
a groove width of the main groove along a width direction of the tread varies in a predetermined repetition cycle along the circumferential direction of the tire;
the main groove has a minimum-width portion $W_{MIN}$ at which the groove width is minimum, and a maximum-width portion $W_{MAX}$ at which the groove width is maximum, the maximum-width portion $W_{MAX}$ adjacent to the minimum-width portion $W_{MIN}$ in the circumferential direction of the tire;
a ratio of the groove at the minimum-width portion $W_{MIN}$ and the groove at the maximum-width portion $W_{MAX}$ satisfies a relation of $35\% \leq W_{MIN}/W_{MAX} \leq 85\%$;
a wide-width groove portion which includes the maximum-width portion $W_{MAX}$ of the groove width is provided in the main groove;
the opened lug groove and the closed lug groove are inclined with respect to the circumferential direction of the tire;
the closed lug groove does not communicate with the main groove;
the opened lug groove communicates with the main groove at a location which is located between the minimum-width portion $W_{MIN}$ and the maximum-width portion $W_{MAX}$;
the location is nearer to the maximum-width portion $W_{MAX}$ than to the minimum-width portion $W_{MIN}$;
a center line of the main groove extending along the circumferential direction is located inside of an equator line of the tire when seen from the direction in which the tire is mounted on a vehicle, and
wherein:
the main groove forms a wide-width groove portion which includes the maximum-width portion $W_{MAX}$;
a raised portion which is raised outward in a radial direction of the tire is formed in a bottom portion of the main groove;
the raised portion is formed in the wide-width groove portion;
a width of the raised portion at bottom is shorter than a width of the maximum-width portion $W_{MAX}$; and
a depth of the main groove at both sides of the raised portion in the width direction is equal to a depth of the main groove at the minimum-width portion $W_{MIN}$.

2. The pneumatic tire according to claim 1, wherein a relation of $(W_{MAX}-W_{MIN})/A \leq 0.25$ is satisfied where an average length along the width direction of the tread of the main groove is set to A.

3. The pneumatic tire according to claim 1, wherein distance from the equator line of the tire to the main groove is 9 to 25% with respect to a contact width of the tread with respect to the width direction of the tread.

4. The pneumatic tire according to claim 1, wherein the first groove wall and the second groove wall have a predetermined amplitude along the width direction of the tread and the predetermined repetition cycle is 15 times to 100 times the predetermined amplitude.

5. The pneumatic tire according to claim 1, wherein a first side portion of the raised portion which faces the first groove wall extends along the first groove wall and a second side portion of the raised portion which faces the second groove wall extends along the second groove wall.

6. The pneumatic tire according to claim 5, wherein the raised portion is tapered toward a front end portion and a rear end portion when seen from a plane of the tread surface.

7. The pneumatic tire according to claim 6, wherein the height of the raised portion is smaller than the depth of the main groove.

* * * * *